(12) United States Patent
Woods et al.

(10) Patent No.: US 7,210,993 B2
(45) Date of Patent: May 1, 2007

(54) OPTIMAL HOG CARCASS PROCESSING SYSTEM AND METHOD

(75) Inventors: Lincoln Woods, Marshall, MO (US); Thomas Hayes, Wichita, KS (US); Gregory Wurtz, Wichita, KS (US); Anthony Sommers, Beardstown, IL (US)

(73) Assignee: Cargill Meat Solutions Corporation, Wichita, KS (US)

( * ) Notice: Subject to any disclaimer, the term of this patent is extended or adjusted under 35 U.S.C. 154(b) by 143 days.

(21) Appl. No.: 10/410,570

(22) Filed: Apr. 9, 2003

(65) Prior Publication Data

US 2003/0236063 A1     Dec. 25, 2003

Related U.S. Application Data

(60) Provisional application No. 60/372,073, filed on Apr. 12, 2002.

(51) Int. Cl.
*A22C 17/00* (2006.01)

(52) U.S. Cl. .................................... 452/149

(58) Field of Classification Search ............... 452/149, 452/150, 153, 156, 157, 158, 159
See application file for complete search history.

(56) References Cited

U.S. PATENT DOCUMENTS

| 4,194,267 A | * | 3/1980 | Johnson et al. | 452/157 |
| 4,557,014 A | * | 12/1985 | Vogt | 452/151 |
| 5,334,084 A | * | 8/1994 | O'Brien et al. | 452/157 |
| 6,104,966 A | * | 8/2000 | Haagensen | 700/116 |
| 6,354,933 B1 | * | 3/2002 | Archambault et al. | 452/135 |
| 6,607,431 B2 | * | 8/2003 | Torrelli | 452/149 |

FOREIGN PATENT DOCUMENTS

| GB | 2 009 471 | * | 6/1979 | 452/151 |

* cited by examiner

*Primary Examiner*—Thomas Price
(74) *Attorney, Agent, or Firm*—Cargill, Inc.; Dorsey & Whitney LLP

(57) ABSTRACT

A system and a method for determining a break point of a plurality of hog carcasses is disclosed. The method includes establishing at least one criterion for determining whether the loin of a carcass should be boned. Data is then collected from the hog carcasses relating to the quality of the hog carcasses. Next a determination is made, based on the criteria, whether the loin of a selected carcass of the plurality of hog carcasses is appropriate for boning. If so, the break point of the selected carcass is adjusted appropriately.

3 Claims, 5 Drawing Sheets

Kill Summary (Head)

| Lean% | 1-140 | 141-147 | 148-154 | 155-162 | 163-169 | 170-176 | 177-184 | 185-191 | 192-198 | 199-206 | 207-213 | 214-221 | 222-228 | 229-774 | Total |
|---|---|---|---|---|---|---|---|---|---|---|---|---|---|---|---|
| 40% | 2 | 0 | 2 | 0 | 2 | 0 | 0 | 3 | 2 | 2 | 2 | 0 | 0 | 3 | 21 |
| 41% | 0 | 1 | 0 | 2 | 4 | 1 | 1 | 1 | 1 | 0 | 0 | 1 | 1 | 0 | 11 |
| 42% | 0 | 0 | 0 | 2 | 5 | 2 | 4 | 5 | 2 | 1 | 3 | 1 | 2 | 3 | 26 |
| 43% | 1 | 0 | 2 | 3 | 1 | 1 | 5 | 6 | 4 | 2 | 4 | 3 | 3 | 8 | 43 |
| 44% | 2 | 1 | 1 | 4 | 5 | 4 | 13 | 10 | 5 | 3 | 9 | 6 | 2 | 17 | 65 |
| 45% | 2 | 2 | 3 | 5 | 4 | 11 | 16 | 10 | 14 | 7 | 12 | 11 | 3 | 24 | 111 |
| 46% | 1 | 3 | 4 | 8 | 11 | 21 | 30 | 19 | 15 | 20 | 15 | 22 | 18 | 33 | 185 |
| 47% | 5 | 2 | 10 | 9 | 15 | 32 | 36 | 25 | 39 | 48 | 44 | 35 | 21 | 55 | 345 |
| 48% | 5 | 3 | 7 | 17 | 24 | 46 | 78 | 75 | 63 | 76 | 71 | 55 | 43 | 88 | 578 |
| 49% | 8 | 5 | 9 | 18 | 39 | 45 | 119 | 91 | 116 | 119 | 102 | 95 | 65 | 152 | 920 |
| 50% | 11 | 9 | 13 | 37 | 53 | 100 | 177 | 158 | 153 | 181 | 134 | 146 | 111 | 196 | 1,322 |
| 51% | 18 | 9 | 22 | 48 | 72 | 89 | 221 | 212 | 229 | 275 | 234 | 200 | 136 | 206 | 1,892 |
| 52% | 18 | 19 | 23 | 65 | 86 | 143 | 230 | 239 | 276 | 338 | 228 | 215 | 140 | 224 | 2,139 |
| 53% | 21 | 27 | 37 | 65 | 93 | 164 | 257 | 297 | 312 | 359 | 238 | 209 | 116 | 150 | 2,265 |
| 54% | 23 | 16 | 17 | 69 | 93 | 148 | 210 | 268 | 279 | 299 | 207 | 140 | 76 | 72 | 2,005 |
| 55% | 18 | 16 | 34 | 72 | 69 | 114 | 129 | 212 | 220 | 210 | 123 | 87 | 34 | 29 | 1,491 |
| 56% | 17 | 14 | 26 | 44 | 52 | 65 | 60 | 133 | 122 | 105 | 37 | 26 | 10 | 12 | 897 |
| 57% | 19 | 10 | 15 | 23 | 23 | 27 | 37 | 53 | 61 | 25 | 10 | 5 | 0 | 0 | 432 |
| 58% | 9 | 4 | 8 | 11 | 10 | 16 | 13 | 23 | 11 | 5 | 3 | 1 | 0 | 0 | 157 |
| 59% | 19 | 8 | 6 | 8 | 5 | 2 | 5 | 3 | 4 | 6 | 0 | 0 | 0 | 0 | 84 |
| 60% | | | | | | | | 1 | 0 | 0 | 0 | 0 | 0 | 0 | 54 |
| Totals: | 200 | 149 | 239 | 511 | 667 | 1,032 | 1,643 | 1,843 | 1,928 | 2,081 | 1,476 | 1,258 | 782 | 1,275 | 15,083 |

FIG. 4

OPTIMAL HOG CARCASS PROCESSING SYSTEM AND METHOD

CROSS-REFERENCE TO RELATED APPLICATIONS

This application claims priority to U.S. provisional patent application No. 60/372,073, entitled "System and Method for Optimal Hog Carcass Processing," filed Apr. 12, 2002, which is hereby incorporated by reference in its entirety.

FIELD OF THE INVENTION

The present invention relates to a system and method for processing hogs. More specifically, the present invention relates to aligning carcasses on an automated line for processing.

BACKGROUND OF THE INVENTION

The cutting floor of a typical meat packaging facility may produce meat products representing a value of several hundred million dollars each year. The value of the meat products that are produced is dependent on the way the animal carcasses are divided into primals and on the way the primals are trimmed of fat, skin and extraneous portions. The primals of a hog carcass are the shoulder (which includes the boston butt and the picnic), loin, ham, belly, and ribs. Cutting floor operations, if monitored at all, have typically been monitored on the basis of total daily production of various primals.

In commercial meat packing operations, animals, such as hogs, are slaughtered, bled, skinned, eviscerated, and the resulting carcass is then cut into halves before it is chilled. The carcasses are typically suspended from an overhead rail and are moved by a conveyor on the rail. The carcasses are then placed on a table and sent down a conveyor to a chop saw where the carcass is broken or cut at a pre-determined point between the loin portion and the shoulder portion. After the carcass is broken, the loin portion is either sent down a first line where the bones will remain in the loin or sent down a second line where the bones are removed.

A loin that is boned becomes a boneless loin. A loin that is not boned becomes a bone-in loin. A loin that is not boned is commonly referred to on the processing floor as a boxed loin.

Once the decision to bone or box the loin of the carcass has been made, the carcasses are broken between the shoulder and the loin area. This breaking point is typically located medially between the first and second rib (referred to as one and a half (1.5) ribs) from the head of the carcass. After each carcass is broken at 1.5 ribs, the carcasses that will be boned are sent down a separate line from the carcasses that will be boxed. The loins of the carcasses that go down the boning line are trimmed and the bones removed. Industry regulations require that certain muscle meat, primarily longissimus lumbarum, multifidus and spinalis dorsi complexus muscles be trimmed from the boneless pork loin. The trimmings that result from the boning process are used to make processed meat. Although the meat is not wasted, the meat would be significantly more valuable if it had remained attached to the shoulder portion instead of becoming trimmings.

Therefore, there is a need in the hog processing industry for a system and method of automatically adjusting the break point of a carcass, based on whether the loin of the carcasses will be boned or boxed to reduce the amount of the carcass which is processed as trimmings. There is a further need for such a system that operates without slowing down the speed of the processing line.

SUMMARY OF THE INVENTION

The present invention is a method and system for tracking and breaking a hog carcass. One embodiment of the invention is a method for processing a hog carcass wherein the break point for separating the loin portion of the carcass from the shoulder portion is automatically adjusted based on whether the loin will be boned (i.e., a boneless loin), or boxed (i.e., a bone-in loin).

The objective is to maximize the value of the various cuts (e.g., the shoulder portion and the loin, both bone-in and boneless), while minimizing the amount of required trimming. These cuts are optimized and trimming is minimized according to the following hierarchy of principals. A boneless loin is more valuable than a bone-in loin. The loin is more valuable than the shoulder. Pork trimmings are substantially less valuable than a bone-in loin or shoulder.

Each carcass is evaluated based on factors such as weight, lean percentage, and pH to determine if the loin of the carcass should be boned or boxed. The highest quality, weight, and leanness of meat are chosen for the boneless loins. If the loin is boned, the carcass is broken at or about 2 ribs from the head of the carcass. If the loin is boxed, trimmings are minimized by breaking the carcass at 1.5 ribs from the head of the carcass.

In one embodiment, the break point of the carcass is automatically adjusted by moving a laser light that shows an operator where to position the carcass on a cutting table. After an operator positions the carcass on the cutting table, the table is moved by conveyor to a chop saw. Based on the position of the carcass on the table, as determined by the laser light, the carcass will either be cut at 1.5 or 2 ribs from the head of the carcass. This process allows the operator to quickly position each carcass on the table without having to reference external sources, such as a display panel, to determine how to line up the carcass.

Another embodiment of the present invention is a hog carcass tracking and breaking system. The information associated with each hog carcass, such as weight lean percentage, pH and the like is tracked for each carcass using a trolley identification system. As the carcass travels down the cut floor, the information associated with carcass is accessed using the trolley number of the carcass. The system includes a computer running a software program for analyzing and determining whether the loin of a carcass will be boned or boxed. The computer provides control signals to a a programmable logic controller (PLC). The trolley identification system is networked with the computer through the use of the computer program.

The software program evaluates the meat quality information and determines whether the loin of the carcass should be boned or boxed. The PLC communicates with a laser light on the cutting table to adjust the break point of the carcass. The PLC sends a signal to energize a solenoid to illuminate one of at least two laser lights (or to position a single laser light) on the cutting table that automatically adjusts the light according to whether the loin will be boned or boxed. If the carcass is to be a bone-in loin, the laser light will mark the carcass so as to cause a cut between the first and second ribs (1.5 rib mentioned above). If the loin from the carcasses is to be boned, a second laser light will illuminate a strip across the carcass to cause a cut approximately half a rib closer to the posterior end of the carcass to cause the cut to be made at or about the second rib. The positions marked by the laser light may or may not correspond to an actual cutting point, but will provide a point of alignment for the operator.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

FIG. 4 is a display screen of a report containing a summary of hog carcass information collected on the kill floor of a hog processing line.

DETAILED DESCRIPTION

The present invention maximizes the value of the cuts from a hog carcass. The invention utilizes a hierarchal analysis to best determine how to maximize value from the daily yield of the carcasses from the kill floor. A focus is placed on the following three basic cuts from a hog carcass: the shoulder, a bone-in or boxed loin end, or a boneless loin. The boneless loin is more valuable than the bone-in loin and either loin cut is more valuable than the shoulder. Pork trimmings resulting from a cut (e.g., a boneless loin) are substantially less valuable than either loin cut or the shoulder cut.

The present invention optimizes boneless loins and includes a system of breaking (i.e., cutting) the hog carcasses so that trimmings are either not produced or are minimized when cutting a boneless loin. Such optimization leaves those portions of meat that would have been trimmed as part of the shoulder for boneless loins or allocates the meat appropriately between the shoulder and the loin for bone-in loins.

Carcass evaluation is typically performed on the kill floor by collecting data such as the overall weight, the lean percentage of meat, and the pH of each carcass. The lean percentage is obtained with a grading device that calculates an expected total lean content of the expected primal yields based on measurements of fat and muscle depth. The pH readings are collected and used to calculate the water content of each carcass. The water content or pH of the meat indicates the resistance of the meat when cooked. Optional values of pH exist at or about the time the animal is slaughtered, and within the 24 hour period following the slaughter. These data points are evaluated using preset guidelines and the results are used to determine if the loin of the carcass will be boned or not.

After the criteria is analyzed to maximize the value of the loins by optimizing boned loins, the system proceeds to minimize the trimmings. In other words, a carcass that is selected for a boned loin is cut at a different position than a carcass that is selected for a boxed loin. The boned loin can be cut closer to the second rib than the first rib, it can be cut at or about the second rib, or it can be cut at or after the second rib in order to minimize the trimmings. The meat that would normally be trimmed thus remains with the shoulder and can be sold as part of the shoulder portion. A number of embodiments are described below.

Figure 1:
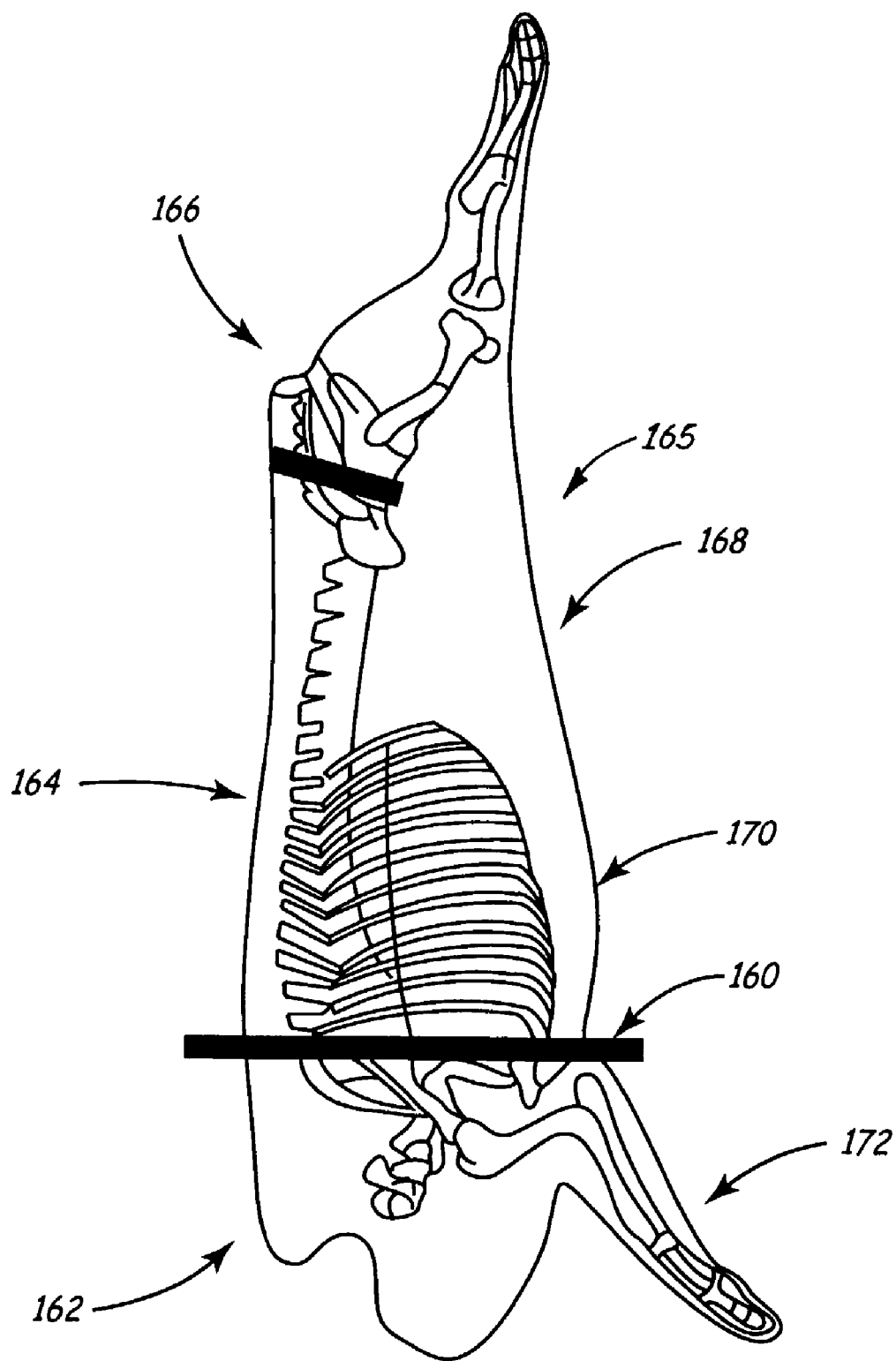
FIG. 1 is a side view of a hog carcass.

FIG. 1 shows a side view of a hog carcass 165. The decision to bone or box a carcass 165 dictates how the carcass 165 is broken. By properly adjusting the break point, the value of the meat on the carcass 165 is increased. The hog carcass 165 includes six primals, the general location which are illustrated as follows: the boston butt 162, the loin 164, the ham 166, the belly 168, the ribs 170, and the picnic 172. The process described herein benefits the loin 164 and the shoulder 162 by reducing the amount of trimmings created during the cutting process. This process, however, could be used on other areas of the carcass 165 to achieve similar results.

As shown by line 160, when the hog carcass 165 is cut at 1.5 ribs from the head, a certain portion of the meat is associated with the shoulder 162 and the remaining meat becomes part of the loin 164. When the loin 164 is boxed, the bones are not removed from the loin 164. When the loin 164 is boned, however, the loin 164 requires trimming away a portion of meat in order to remove the bones and achieve a boneless loin. The portion of meat trimmed off the loin 164 is the area next to the boston butt 162 including the portion between the first and second ribs. This portion of meat is considered trimmings or scrap meat that has a value of approximately half that of the meat that remains attached to the shoulder.

When the hog carcass 165 is cut further from the head (i.e., close to or beyond the second rib), the portion of meat that previously became trimmings is left on the shoulder 162. Thus, when the loin 164 is boned, the portion of meat that was previously trimmed remains attached to the shoulder 162 and does not need to be removed. While some meat may still need to be trimmed for the boning process, the majority of what would have been trimmings remains on the shoulder 162 of the carcass. Thus, the value of this meat has been increased and the task of trimming the meat from the loin 164 has been eliminated or reduced.

Figure 5:
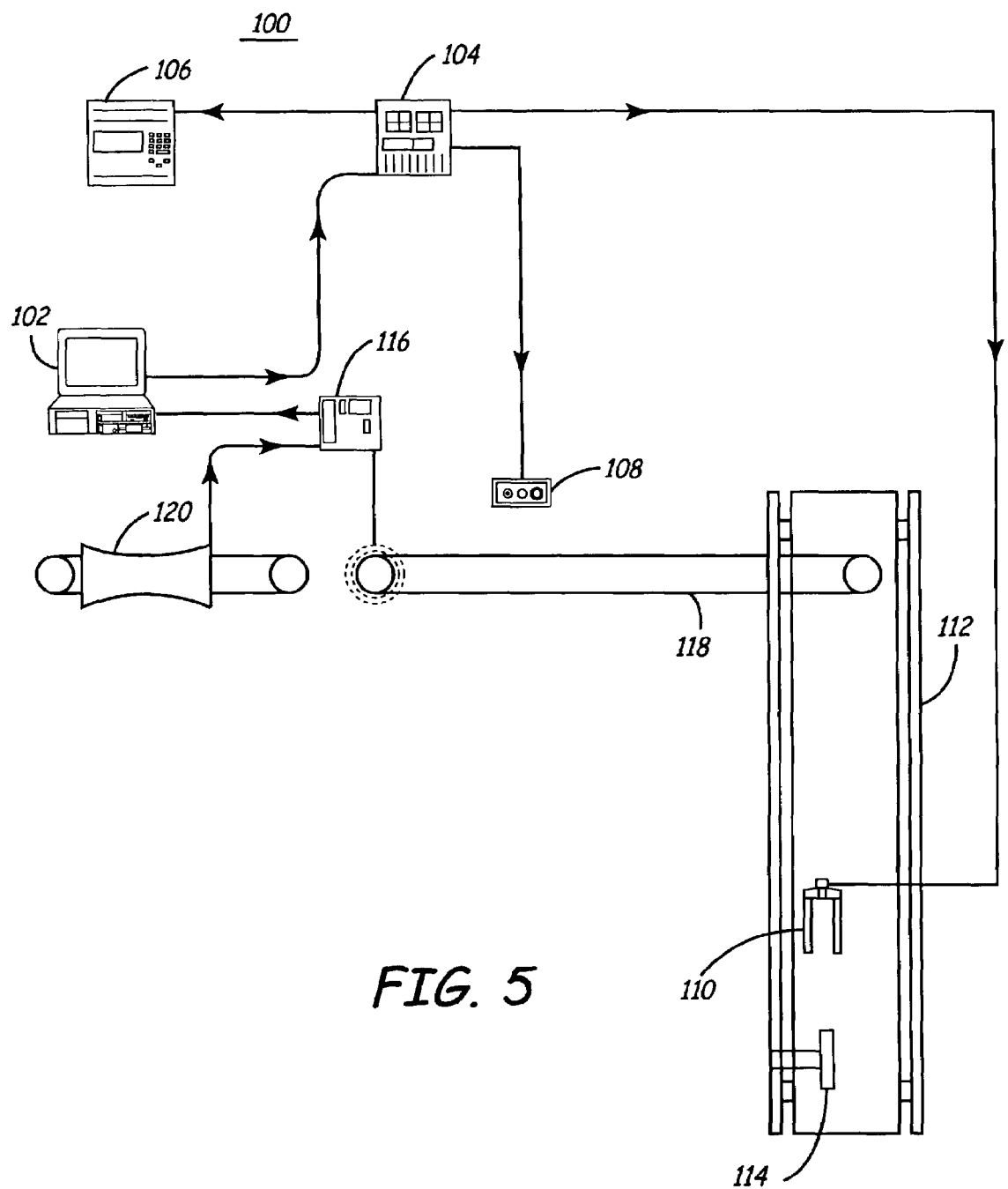
FIG. 5 is a schematic of the components and computer architecture used to electronically track and process hog carcasses.

When placing the carcass 165 on a conveyor, the operator consistently lines up a predetermined point on the carcass 165 with the light from a laser 110 (FIG. 5). This predetermined point is typically at one and a half (1.5) ribs from the head of the carcass 165, but the reference point may vary. Line 160 is representative of a light from the laser 110 lined up at the 1.5 rib position. Accordingly, the operator lays the carcass 165 on the conveyor 112 such that line 160 is lined up at 1.5 ribs from the head.

If the loin of the carcass 165 is to be boxed, the carcass 165 is cut at 1.5 ribs from the head. However, if the carcass 165 is to be boned, the carcass 165 is cut at a location further from the head. For example, in one embodiment, if the carcass 165 is to be boned, it is cut at from about 1.75 to about 3 ribs from the head. In another embodiment, if the carcass 165 is to be boned, it is cut at about 2 ribs from the head. Various techniques can be used to accomplish this change in the location of the cut.

In one embodiment, the position of the light from the laser 110 varies. For example, if the carcass 165 is to be boxed, the laser light does not move, but if the carcass 165 is to be boned the position of the light from the laser 110 is adjusted. Moving the laser light 110 causes the operator to adjust the location of the hog carcass 165 on the cutting table of the conveyor 112. Because a chop saw 114 (FIG. 2) is in a fixed location, by adjusting the location of the carcass 165 on the cutting table, the break point of the carcass 165 is adjusted. Thus, when the light from the laser 110 remains in its original location, the chop saw 114 breaks or cuts the carcass 165 at 1.5 ribs for boxing. When the light from the laser 110 is adjusted for boning, the location of the carcass 165 on the conveyor belt is moved accordingly. For example, where the carcass 165 to be boned is cut at 2 ribs, the position of the laser light 110 is adjusted by 0.5 ribs. The operator then adjusts the carcass 165 forward on the conveyor 112, such that the adjusted position of the laser light 110 still lines up at 1.5 ribs. That is, the light 160 provides a reference for the operator to position a known portion of the carcass 165 against. Thus, when the carcass 165 advances a fixed distance to the chop saw 114, the location of the cut is at 2 ribs To shift the position of the laser guidance line 160, the laser emitter 110 can itself be physically moved. Alternatively, the laser emitter can be adjusted optically (e.g., prisms, beam splitters, etc.). Two different laser emitters could also be provided, with only the appropriate emitter being turned on to reference a particular cut. Alternatively, the position of the light from the laser 110 does not change, but instead the distance that the conveyor 112 is advanced varies. For example, in the embodiment, where a carcass 165 to be boned is cut at 2 ribs, the advancement distance of the carcass 165 is reduced by a distance corresponding to about 0.5 ribs.

There are many ways to adjust the point at which a hog carcass 165 is cut, but the process described herein allows the operator to quickly and efficiently line up the carcass 165 on the cutting table of the conveyor 112. The operator does not need to evaluate each carcass 165 or reference a display to determine at what point the carcass 165 should be broken. Essentially, the operator does not even need to know whether a particular carcass 165 is to be boned or boxed. The operator can focus on the task of lining up the carcass 165 as quickly as possible and the system automatically adjusts the break point of the carcass 165 without an intentional act on the part of the operator.

In order to maximize the value of the present invention, a decision as to cut a boneless loin or a boxed loin is made prior to the carcass 165 reaching the operator at the cutting point. That is, it would generally be inefficient for the operator to have to make that evaluation and determination himself. Thus, the carcass 165 is previously evaluated and the results are presented to the operator in an automated fashion. For example, the carcass 165 may be tracked by the system and as it reaches the cutting point, the laser emitter is automatically adjusted. Alternatively, the operator could enter a tracking number or other identifier to input this information at the point of cutting. Thus, the present invention provides for various ways to classify and evaluate carcasses 165, move and track the carcasses 165, and facilitate alignment of the carcasses 165 for cutting.

Figure 2:
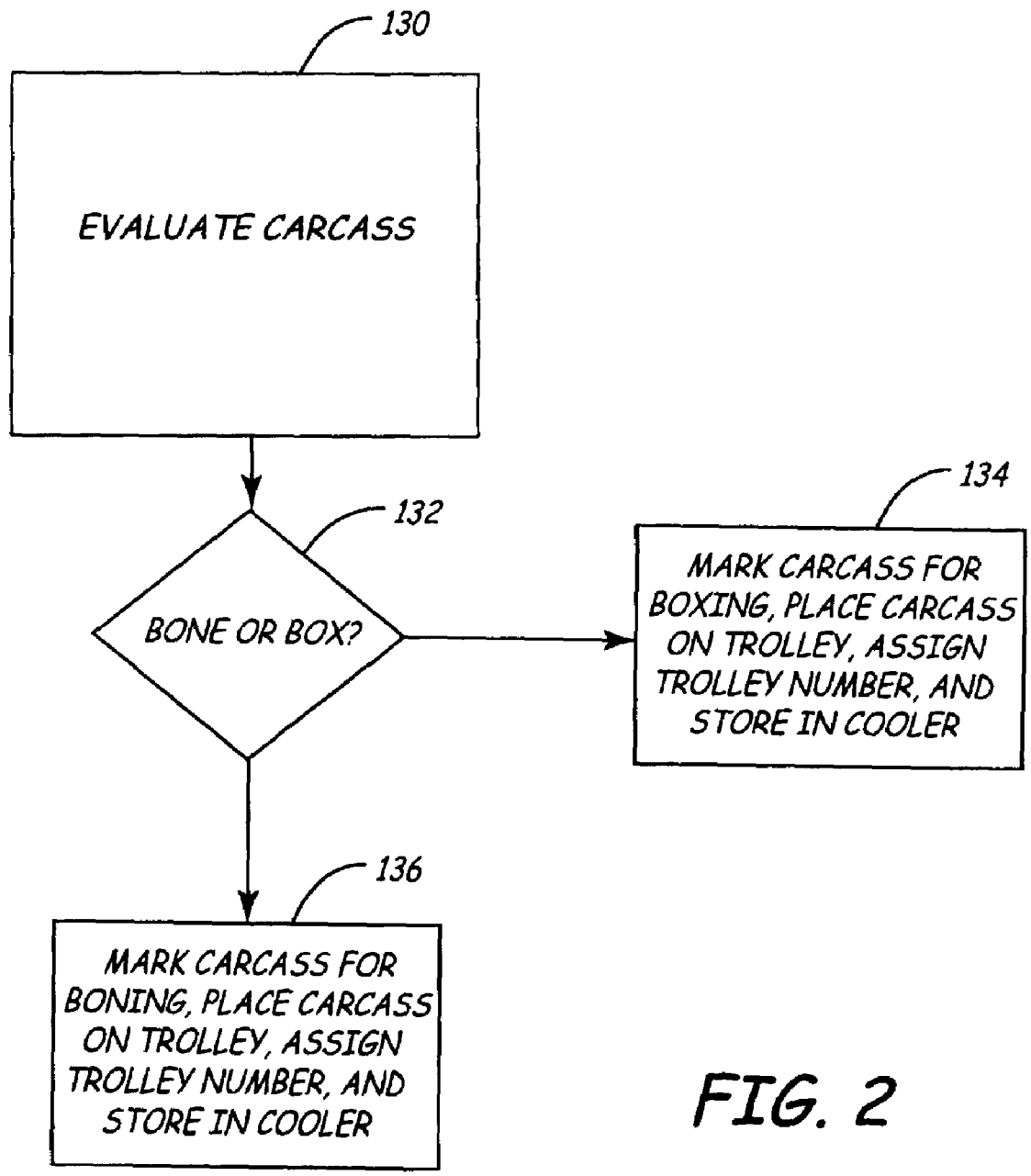
FIG. 2 is a flowchart of the steps performed on the kill floor of a hog processing line.

FIG. 2 is a flowchart showing the steps performed on the kill floor in preparation for determining whether a carcass 165 should be boned or boxed. Initially, the carcass 165 is evaluated based on criteria such the weight, lean value, and pH which are measured (block 130). A decision is made as to bone or box (block 132) the carcass 165.

This decision can be made manually by evaluating the information or it can be made automatically by entering the information into a system that then records the decision. For example, a combination of carcass 165 weight and lean percentage may be used. By way of example, a carcass 165 having a weight of about 160 pounds is boned only if its lean percentage is greater than about 60 percent, and a carcass 165 having a weight of about 230 pounds is boned if its lean percentage is greater than about 42 percent. In other words, in this range, a carcass 165 is boned if:

$$carcass\_weight = 160 + 3.89(60 - \%)$$

The remaining carcasses 165 will have the loins boxed. Although the carcasses 165 may be evaluated in more detail on the cut floor, as explained below, the initial decision of whether to bone or box, (block 132), allows the carcasses 165 to be sorted in the cooler. In other embodiments, other weights and lean percentages may be used to make the bone or box decision.

FIG. 4 shows a display screen of a report 190 containing a summary of kill information that can be used as a basis for evaluating carcasses 165 for a boning or boxing evaluation. The weight ranges 192 are listed across the top of the report 190 and lean percentage ranges 194 are listed along the side of the report 190. One possible goal in choosing loins to bone is to select heavier carcasses 165 with higher lean percentages. For example, a carcass 165 in the 229+ pound weight range and 60% lean range would be optimal for boneless loins, as shown by the lower right hand corner of the report in FIG. 4. A carcass 165 that falls into the range on the opposite end of the scale, 1–140 pound weight range and 40% lean range would not typically produce loins that are boned.

Typically, each day the breakdown of numbers on the report changes, depending on the type of carcasses 165 received. A user or automated system evaluates the report 190 to determine what values to use to make the determinations to bone or box (152). For example, based on the rough guideline of boning 50% of the loins, the user determines the cutoff point for boning. The result is typically based on a line 196 drawn on the report. The result is that all the carcasses 165 that fall below the line 196 will have the loins boned and the remaining carcasses 165 will have the loins boxed. In one embodiment, the line 196 separating boned loins from boxed loins is generated automatically by the software program based on a value specifying the fraction of loins to be boned and boxed, using techniques known in the art.

Returning to FIG. 3, if the weight and lean value of a carcass 165 does not meet the requirements for boning, the carcass 165 is automatically marked for boxing using an inker (block 134) or other marking method known in the art. The carcasses 165 that do meet the requirements for boning are marked for boning (block 136). Such marking may include physically marking the carcass 165 or its carrier, or electronically coding and identifying the carcass 165 for use in an automated transport. If electronically tracked, the carcass 165 data can include hot weight, lean percentage, owner, cold weight, and the bone or box decision. The carcass 165 is then stored in the cooler until needed on the cut floor. The criteria used to determine whether to box or bone can be adjusted. That is, daily goals may alter the evaluation. For example, there may be a goal of boning 50% of the carcasses 165. If, as the day progresses, this goal is not being met, the criteria could be altered to increase or decrease the volume of carcasses 165 selected for boning.

Figure 3:
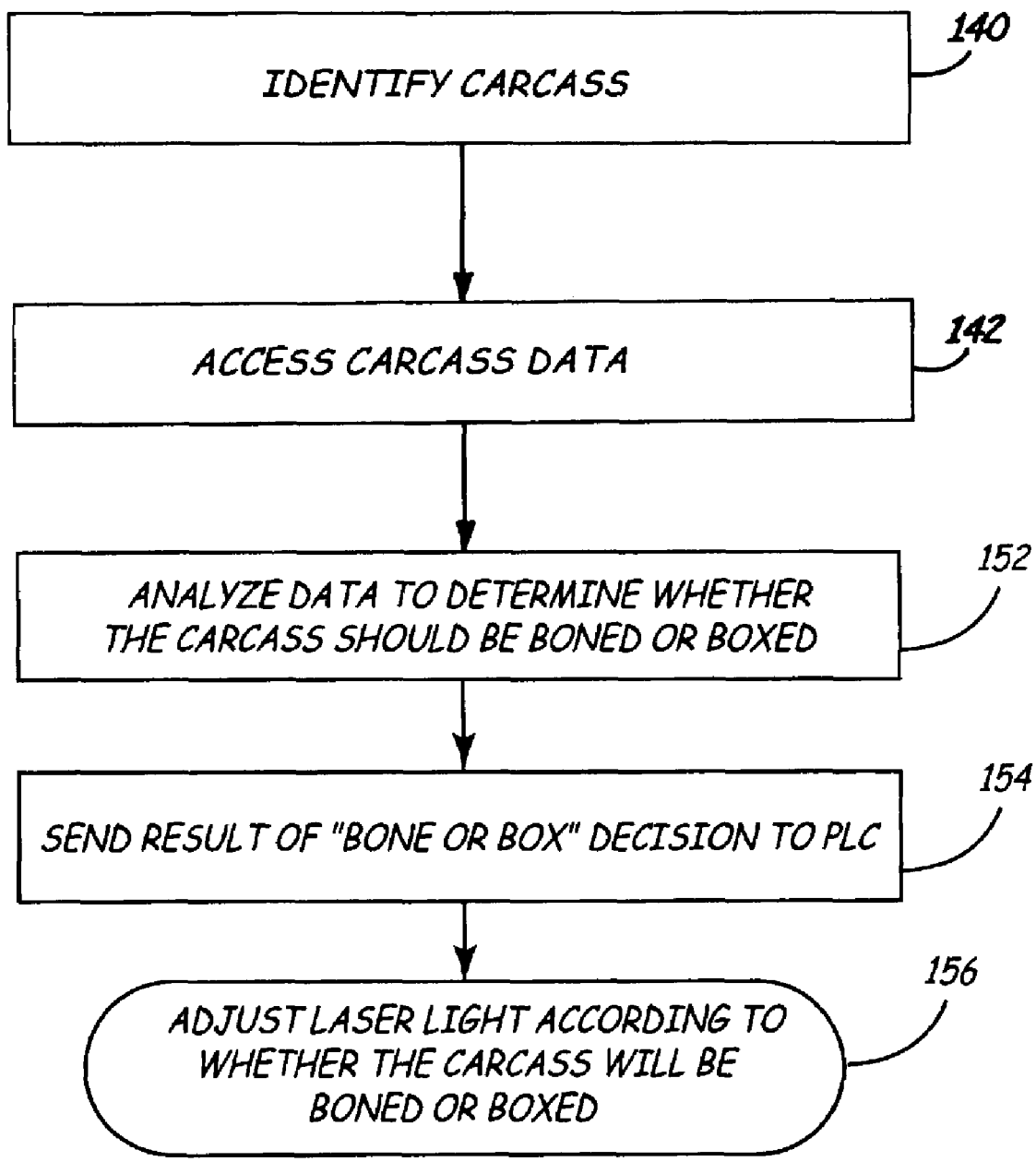
FIG. 3 is a flowchart of the steps performed on the cut floor of a hog processing line.

FIG. 3 is a flowchart of the steps performed on the cut floor. As the carcass 165 is transferred down the cut floor, the carcass 165 is identified. For example, a trolley used to transport the carcass 165 may have an identifier that is entered by an operator or automatically scanned. The trolley number is stored in the computer 102, along with other information associated with the carcass 165, such as the weight, lean percentage, and pH from the previous day's slaughter. The trolley number and associated information is accessed from the database of the computer 102 (block 142).

The data for the carcass 165 is then analyzed to determine whether to bone or box the loin of the carcass 165 (block 152). In one embodiment, this decision is initially made on the kill floor, and the decision is more carefully analyzed on the cut floor at this point and adjusted based on the processing needs of the day. In another embodiment, the decision is made only once and is not reanalyzed. After the decision to bone or box has been made, the decision is sent (block 154) to a programmable logic controller (PLC) 104 (FIG. 6). The PLC 104 relays the information to the light from the laser 110. The light from the laser 110 is automatically adjusted or offset based on the decision to bone or box (block 156).

As each carcass 165 comes down the cut line, it is placed on the cutting table of the conveyor 112. The carcass 165 is then lined up on the cutting table by an operator. The operator uses the light from the laser 110 to line up the carcass 165. In other words, the light from the laser 110 essentially makes a line on the carcass 165 for the operator to align to or cut along. This process takes approximately 2 or 3 seconds per carcass 165. Thus, the operator does not have time to review a computer screen and determine the location of the carcass 165 on the cutting table. Instead, the operator relies on the light from the laser 110 to automatically adjust the location of the carcass 165 according to the bone or box decision for each carcass 165.

FIG. 5 shows a schematic of the components and computer architecture of the hog processing system 100 used to electronically track and process hog carcasses 165. This embodiment of the invention includes a computer 102 for collecting, storing, and analyzing the information from the cut floor for each hog carcass 165. The computer 102 executes a software program that uses the collected data to determine whether the loin of a particular hog carcass should be boned or boxed.

Information from the computer 102 is sent to the programmable PLC 104. In one embodiment, the PLC 104 is an Allen-Bradley SLC500. The PLC 104 uses the information from computer 102 to update a display panel 106. In one embodiment, the display panel 106 is an Allen-Bradley PanelView 550. The PLC 104 also communicates with a light display 108 and the light from the laser 110. The light display 108 is used to indicate whether the loin of a particular carcass 165 is being boned or boxed. The light from the laser 110 is used by an operator to line up each carcass 165 on a cutting table that sits on the conveyor 112. The carcass 165 is then cut by a shoulder chop saw 114.

Before each carcass 165 is placed on the conveyor 112, it is presorted based on an analysis of whether the loin of the carcass 165 should be boned or boxed. A trolley identification system 116 is used to track each carcass 165. The trolley identification system 116 may be a vision-based system or a radio-frequency system, as known in the art. In one embodiment, the trolley identification system 116 is a Vande Berg Scale (VBS). The trolley identification system 116 communicates with the computer 102, which allows information associated with a particular carcass 165 to be retrieved, as needed, on the plant floor. The information can also be retrieved from an office computer, or any other computer networked with the computer 102. The information associated with a carcass 165 may include its weight, lean content, pH, and any other relevant information. In other embodiments, other devices or methods known in the art may be used to track the carcasses 165.

During operation of the system 100, a hog carcass 165 is taken from the cooler and sent to the cut floor. The carcass 165 is placed on a chain 118 for transportation to the conveyor 112. Although FIG. 5 only displays one conveyor, multiple conveyors may be used. In one embodiment of the present invention, while the hog carcass 165 is being transported to the conveyor 112, the software program located on the computer 102 evaluates the weight and lean information collected from the hog carcass 165 on the cut floor and determines whether the loin of the carcass 165 should be boned or boxed. The analysis involved in making this decision is explained in more detail below. A cold weight is also taken for each carcass 165 on the cut floor using a cold scale 120. This weight is stored in the computer 102, via trolley identification system 116, and used as a back-up weight in a situation where the information from the kill floor is not available.

After the bone or box decision has been made by the computer 102, the computer 102 conveys the decision to the PLC 104. The PLC 104 then displays the result for each carcass 165 on the panel display 106 and the light display 108. The PLC 104 also tracks each carcass 165 using the trolley identification system 116 and the computer 102, and when a particular carcass 165 arrives at the conveyor 112, the PLC 104 adjusts the light from the laser 110 based on the bone or box decision made by the computer 102. The operator then positions the carcass 165 on the conveyor 112 such that the laser light is aligned at 1.5 ribs.

Although the present invention has been described with reference to preferred embodiments, persons skilled in the art will recognize that changes may be made in form and detail without departing from the spirit and scope of the invention.

We claim:

1. A method of determining a break point of a plurality of hog carcasses, the method comprising:
   collecting data from the hog carcasses relating to the quality of the hog carcasses;
   determining, based on the data, whether a selected carcass of the plurality of hog carcasses is appropriate for boning; and
   minimizing trimmings of a boneless loin by adjusting the cut point of the selected carcass based on the determination of whether the selected carcass is appropriate for boning.

2. The method of claim 1 further comprising adjusting a laser light located on a cutting table according to whether the carcass is appropriate for boning, wherein the laser light is used to identify the break point of the carcass.

3. A method of determining a break point of a plurality of hog carcasses, the method comprising:
   a step of collecting hog carcass data;
   a step of determining whether a selected carcass is appropriate for boning; and
   a step of adjusting a cut point of the selected carcass to minimize the trimmings of a boneless loin.

* * * * *